(12) United States Patent
Southam et al.

(10) Patent No.: US 7,496,658 B2
(45) Date of Patent: Feb. 24, 2009

(54) SYSTEMS AND METHODS FOR TESTING NETWORK SERVICES

(75) Inventors: Blaine R. Southam, Windsor, CO (US); David Christopher Davidson, Windsor, CO (US); Donna J. Grush, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 694 days.

(21) Appl. No.: 10/615,547

(22) Filed: Jul. 8, 2003

(65) Prior Publication Data

US 2005/0010661 A1    Jan. 13, 2005

(51) Int. Cl.
*G06F 15/173* (2006.01)
*G06F 11/00* (2006.01)

(52) U.S. Cl. .................. 709/224; 709/219; 709/238; 709/233; 709/203; 702/122; 702/123; 702/238; 702/121

(58) Field of Classification Search ......... 709/213–217, 709/224, 245, 203, 238; 370/244, 522; 379/115, 379/230, 229
See application file for complete search history.

(56) References Cited

U.S. PATENT DOCUMENTS

| | | | | |
|---|---|---|---|---|
| 6,055,306 | A | * | 4/2000 | Lozinski et al. ............. 379/230 |
| 6,085,234 | A | * | 7/2000 | Pitts et al. .................. 709/217 |
| 6,160,794 | A | * | 12/2000 | Malik et al. ................ 370/244 |
| 6,678,793 | B1 | * | 1/2004 | Doyle ........................ 711/133 |
| 2003/0004746 | A1 | * | 1/2003 | Kheirolomoom et al. ...... 705/1 |
| 2004/0215826 | A1 | * | 10/2004 | Pfitzner ..................... 709/245 |
| 2005/0021663 | A1 | * | 1/2005 | Knauerhase et al. ........ 709/217 |

* cited by examiner

*Primary Examiner*—Jude J Jean Gilles (57) ABSTRACT

Disclosed are systems and methods for testing a network service. In one embodiment, a system and a method pertain to intercepting a message sent by a network service under test and directed another network service, determining whether the message should be redirected to a mock network service that emulates operation of the other network service, and redirecting the message to the mock network service if it is determined that the message should be so redirected.

14 Claims, 8 Drawing Sheets

| ACTUAL NETWORK SERVICE ADDRESSES | MOCK NETWORK SERVICE ADDRESSES |
|---|---|
| http://provider1.com/longdist . . . | http://localhost/abc1/xyz . . . |
| http://provider2.com/servplan . . . | http://localhost/abc2/xyz . . . |
| http://provider3.com/long/serv . . . | http://localhost/abc3/xyz . . . |
| http://provider5.com/longdist . . . | http://localhost/abc5/xyz . . . |
| http://provider5.com/plans/long . . | http://localhost/abc5/xyz . . . |
| ⋮ | ⋮ |

SYSTEMS AND METHODS FOR TESTING NETWORK SERVICES

BACKGROUND

Network services, such as "web" services, are network-based applications that operate in a distributed computing environment to perform specific tasks in response to client requests. Currently, most such web services are focused on providing a variety of real world services, or information about such services, across the Internet.

To cite an example, a given web service may be designed to identify the cheapest long distance rates for a given client. In such a case, the client may provide various information to the web service such as a client identity, a city and state of residence, an indication of typical calling patterns, etc., and the web service will use that information to identify a service provider and/or calling plan that would cost the least for the client based upon the client-provided information. In making the determination as to which service provider and/or calling plan is best for the client, the web service may leverage the resources of one or more other web services, for instance hosted by one or more long distance service providers (e.g., AT&T™, Sprint™, MCI™, etc.). Specifically, the web service that was called upon by the client to return the best provider/plan may act in the capacity of a client relative to other web services in order to collect information from those services that is needed to make the provider/plan determination.

During development of such a web service, the web service must be tested to ensure that, once deployed on a network (e.g., the Internet), it will work in the manner intended by the developer. Although such testing could be conducted by actually operating the web service live in the intended operating environment (e.g., the Internet), it is undesirable to do so in that if third party web services are called by the web service under development, charges may be unintentionally incurred (e.g., for initiation of long distance services or for service usage fees). Furthermore, the hosts of the third party web services may become irritated with such "false" requests, particularly if many such requests are made of the third party web services during testing.

Although the underlying code of a web service under development could be rewritten to call web services created for test purposes and controlled by the developer, such a testing solution is disadvantageous. In such a case, the web service code must be modified to conduct the testing, and then modified again once testing has been completed to return the code to its original state (i.e., in which it is configured to interact with actual web services in the intended operating environment). Such modification is both time-consuming and expensive. Moreover, given that mistakes can be made in modifying the code after testing is completed, it is possible that glitches or "bugs" may exist in the code at the time of deployment despite positive test results being observed.

From the above, it can be appreciated that it would be desirable to have a system and method for testing a web service in which the web service is tested in a substantially unmodified state and without the web service calling actual third party web services.

SUMMARY

Disclosed are systems and methods for testing a network service. In one embodiment, a system and a method pertain to intercepting a message sent by a network service under test and directed to another network service, determining whether the message should be redirected to a mock network service that emulates operation of the other network service, and redirecting the message to the mock network service if it is determined that the message should be so redirected.

BRIEF DESCRIPTION OF THE DRAWINGS

The disclosed systems and methods can be better understood with reference to the following drawings. The components in the drawings are not necessarily to scale.

DETAILED DESCRIPTION

As described above, it is desired to test a network service, such as a web service, without having to modify the network service code and without having the network service actually interact with other network services that may, for example, be operated by third parties. As is described in this disclosure, a network service can be tested in an emulated operating environment by providing mock clients that submit requests to the network service and mock network services that provide information to the network service under test that is needed to respond to the mock client requests. In that the mock network services emulate the operation of actual network services, the actual network services need not be accessed by the network service under test.

As is further discussed below, a redirection service is used to redirect requests made by the network service under test of actual network services to one or more of the mock network services. By way of example, the redirection service can comprise a network proxy or a data handler. Because of the redirection, the network service under test need not be modified to direct requests to the mock network services and may, therefore, remain hard-coded to interact with the actual network services. Because the mock network services are configured to emulate the responses of the actual network services, the network service under test is "unaware" that it is not really communicating with the actual network services. Accordingly, an accurate picture of how the network service under test would operate in the intended operating environment may be obtained.

Figure 1:
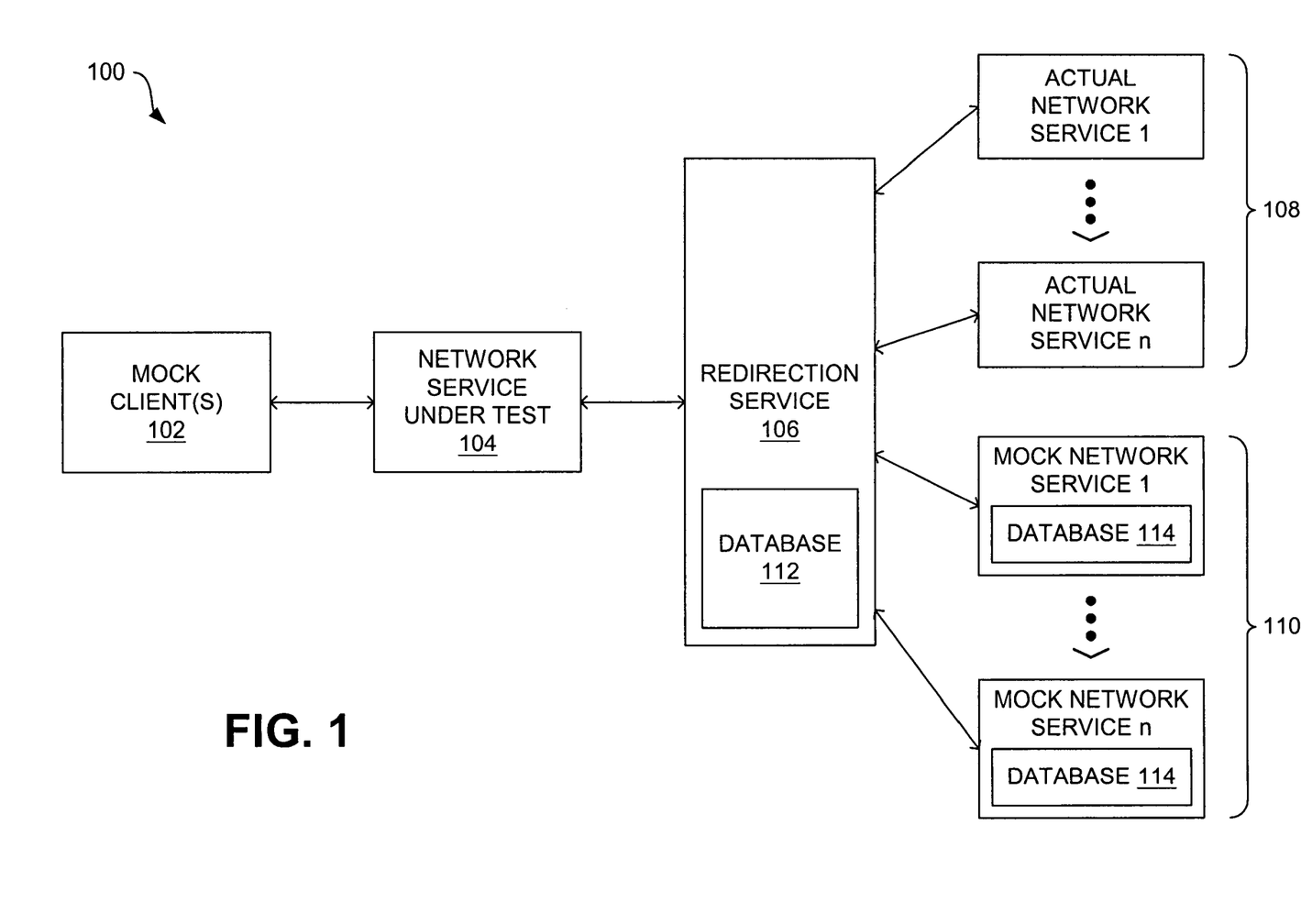
FIG. 1 is a schematic view of an embodiment of a system for testing a web service.

Referring now in more detail to the drawings, in which like numerals indicate corresponding parts throughout the several views, FIG. 1 illustrates an example system 100 for testing a network service, and may otherwise be referred to as the testing environment. As indicated in this figure, the system 100 generally comprises one or more mock clients 102, a network service under test 104, a redirection service 106, one or more actual network services 108, and one or more mock network services 110.

The one or more mock clients 102 represent clients that make requests of the network service under test 104 during the testing. These mock clients 102 comprise generic, data-driven code (i.e. the logic and functionality of the client is determined by an underlying database) and may comprise a network browser, such as a web browser that is configured to communicate on the World Wide Web (i.e. the "Web") via hypertext transfer protocol (HTTP) and hypertext markup language (HTML). Optionally, the mock clients 102 may comprise a client application comprising one or more user interfaces (UIs) that are used to collect information that is to be provided to the network service under test 104 to enable the service to respond to the request.

The network service under test 104, which for convenience will be referred to from this point forward as the "testee service," is the network service that is being tested within the testing environment 100. The testee service 104 may comprise a service that is configured for utilization on the Web and, therefore, may comprise a "web" service. Regardless, the testee service 104 is configured to both receive and supply content (i.e. static and/or dynamic content) over a network, such as the Internet. The testee service 104 is typically configured to use standard Web protocols such as HTTP, HTML, extensible markup language (XML), and simple object access protocol (SOAP). As is known in the art, SOAP is a remote procedure call (RPC) and document exchange protocol used to request and reply to messages between web services. By way of example, the requests sent by the testee service 104 comprise XML messages that are wrapped in SOAP envelopes and transmitted via HTTP.

The core functionality provided by the testee service 104 depends upon the particular implementation. In most embodiments, however, the testee service 104 is configured to communicate with other network services to satisfy requests made by client(s), including the mock client(s) 102. By way of example, the testee service 104 may comprise a service that identifies the least expensive telephone calling plan for the client, locates airline tickets that satisfy client-provided criteria (e.g., departure time, arrival time, cost, etc.), determines the most appropriate form of shipping based upon client requirements (e.g., airmail, next day delivery, etc.), identifies hotels that can accommodate a client itinerary, or the like.

As identified above, the testee service 104 may be configured (i.e. hard-coded) to interact with one or more actual network services 108. For the purposes of this disclosure, the term "actual network service" identifies a network (e.g., web) service that has been deployed for actual, normally public, use on a given network, such as the Internet. By way of example, the actual network services 108 comprise web services that are hosted by third parties, such as those parties that provide services that the client is seeking (e.g., telephone services, plane ticket reservations, shipping services, hotel accommodations, etc.). Such actual network services 108 may be contrasted with the mock network services 110 that, as is described in greater detail below, merely emulate the functionality of the actual network services and which are controlled by those conducting the network service testing.

To avoid unintended interaction between the testee service 104 and the actual network services 108 during testing, the redirection service 106 operates to redirect certain communications (i.e. requests) sent from the testee service and directed to one or more of the actual network services. In some embodiments, the redirection service 106 comprises, or is configured to access, a redirection database 112, such as a lookup table or other data structure, that maps network addresses (e.g., universal resource locators (URLs)) of various actual network services 108 to network addresses (e.g., URLs) of mock network services 110 that emulate the operation of those actual network services. Accordingly, requests sent out from the testee service 104 can be, if desired, rerouted to the network addresses of corresponding mock network services 110 by the redirection service 106. By way of example, the rerouted requests can be directed to SOAP-callable interfaces (e.g., stubs) of the mock network services 110.

Redirection is possible due to the fact that all traffic from the testee service 104 is routed through the redirection service 106. This is achieved by programming the underlying operating environment implemented in the test environment 100 to send all requests issued from the testee service 104 to the redirection service 106. In an embodiment in which the test environment 100 executes on top of a Java virtual machine (JVM), the JVM is configured to direct all traffic originating from the testee service 104 to the redirection service 106.

To illustrate how a request is redirected, assume, for example, that the testee service 104 transmits a request to one of the actual network services 108, and that the request is to be rerouted to one of the mock network services 110. The redirection service 106 identifies the intended destination address (e.g., URL) associated with the request and consults its database 112 (e.g., lookup table) to determine if a corresponding substitute address (e.g., URL) exists. If so, then the substitute address is written into the request in place of the intended destination address, and the request is then transmitted to the desired mock network service 110.

In cases in which no substitute address is included in the database 112, the request (or other communication) is forwarded to the intended destination address. Optionally, a user (e.g., test administrator) may activate or deactivate the rerouting function of the redirection service 106 for selected intended destination addresses. That is to say, when the rerouting function is active for an intended destination address, all requests sent to that address by the testee network service 104 are rerouted. However, if the rerouting function is inactive for the intended destination address, then all requests sent to that address by the testee service 104 are simply forwarded to the intended destination address.

The mock network services 110, like the mock clients 102, comprise generic, data-driven code. Therefore, the mock network services 110 do not actually comprise the business logic of the actual network services 108 that they emulate, and do not actually process requests as do the actual network services. Instead, the mock network services 110 merely receive inputs, in the form of requests, and transmit outputs, in the form of responses to the requests. As indicated in FIG. 1, each of the mock network services 110 includes, or may access, a database 114 (e.g., lookup table or other data structure) that defines the operation of the service. The database 114 of each service 110 maps a number of predefined requests to a corresponding number of pre-configured responses. When a mock network service 110 receives a request from the testee service 104 (via the redirection service 106), the received request is compared to information stored within the table or other data structure, and that information is mapped to one of the responses. The corresponding response is then transmitted to the testee service 104, for example, via the redirection service 106. The responses, like the requests, may comprise XML messages that are wrapped in a SOAP envelope and transmitted via HTTP.

As is apparent from the foregoing, all testee service requests and network service responses are typically routed through the redirection service 106. Assuming HTTP is employed, a socket may be opened in the redirection service 106 in transmitting a request to a mock network service 110. In such a case, the socket is closed when the response is received from the mock network service 110 and relayed back to the testee service 104. Alternatively, responses may be transmitted directly from a mock network service 110 to the testee service 104 in the event a protocol other than HTTP is employed, or if the execution of HTTP with respect to the redirection service 106 is altered. In such a case, a socket opened by the redirection service 106 in sending a request to a mock network service 110 is closed even though a response was never received therefrom.

Although not illustrated in FIG. 1, one or more of the mock client(s) 102, the testee service 104, the redirection service 106, and the mock network service(s) 110 can comprise independent or shared logs in which log entries may be stored that identify the data transmission activity (i.e. transmitting and receiving) of each system component. Furthermore, other operational occurrences, such as error conditions, can also be recorded in an associated log.

Example methods for creating the test environment 100 are described in U.S. patent application Ser. No. 10/449,555 entitled "Simulation of Network Service Test Environments", filed May 30, 2003, which is hereby incorporated by reference in its entirety into this disclosure. In the case in which the testee service 104 is a web service, the one or more mock network services 110 are created with reference to public interfaces, such as a web service description language (WSDL) files, which are available from the hosts of the actual network services (i.e. web services). These files provide the skeletal data structures of the actual network services 108 and therefore describe the interfaces of the actual network services. Specifically, the WSDL files identify the structure of the inputs or requests that the structure of the actual network services 108 may receive, and the output or responses that can be expected from those inputs.

Once the actual network service WSDL files have been obtained, a user can specify one or more mock network service WSDL files using a mock network service WSDL template. The mock network service WSDL files are then used as inputs to a test environment generation system. The number of mock network service WSDL files normally equals the number of mock network services 110 to be created, although one mock network service WSDL file may be employed in the creation of multiple mock network services.

The user (e.g., test administrator) manipulates a data entry mechanism associated with a test environment simulation system to input data associated with the test environment 100. In this respect, configuration data associated with the mock clients 102, the testee service 104, the redirection service 106 (e.g., database 112), and the mock network services 110 (e.g., database 114) is entered. Once all data necessary to create the various components of the test environment 100 is entered, the user then manipulates the test environment simulation system to generate and configure the test environment 100. In particular, the test environment generation system is executed to instantiate or otherwise generate one or more mock clients 102 that are placed in communication with the testee service 104. In cases in which the testee service 104 is a web service, the mock clients 102 are, for example, generated from the WSDL information associated with the testee service. The test environment generation system is also used to instantiate or otherwise generate the one or more mock network services 110 that are placed in communication with the testee service 104. Finally, the test environment generation system instantiates or otherwise generates the redirection service 106, and performs an automated configuration of the testee service 104 using configuration data entered by the user.

Figure 2:
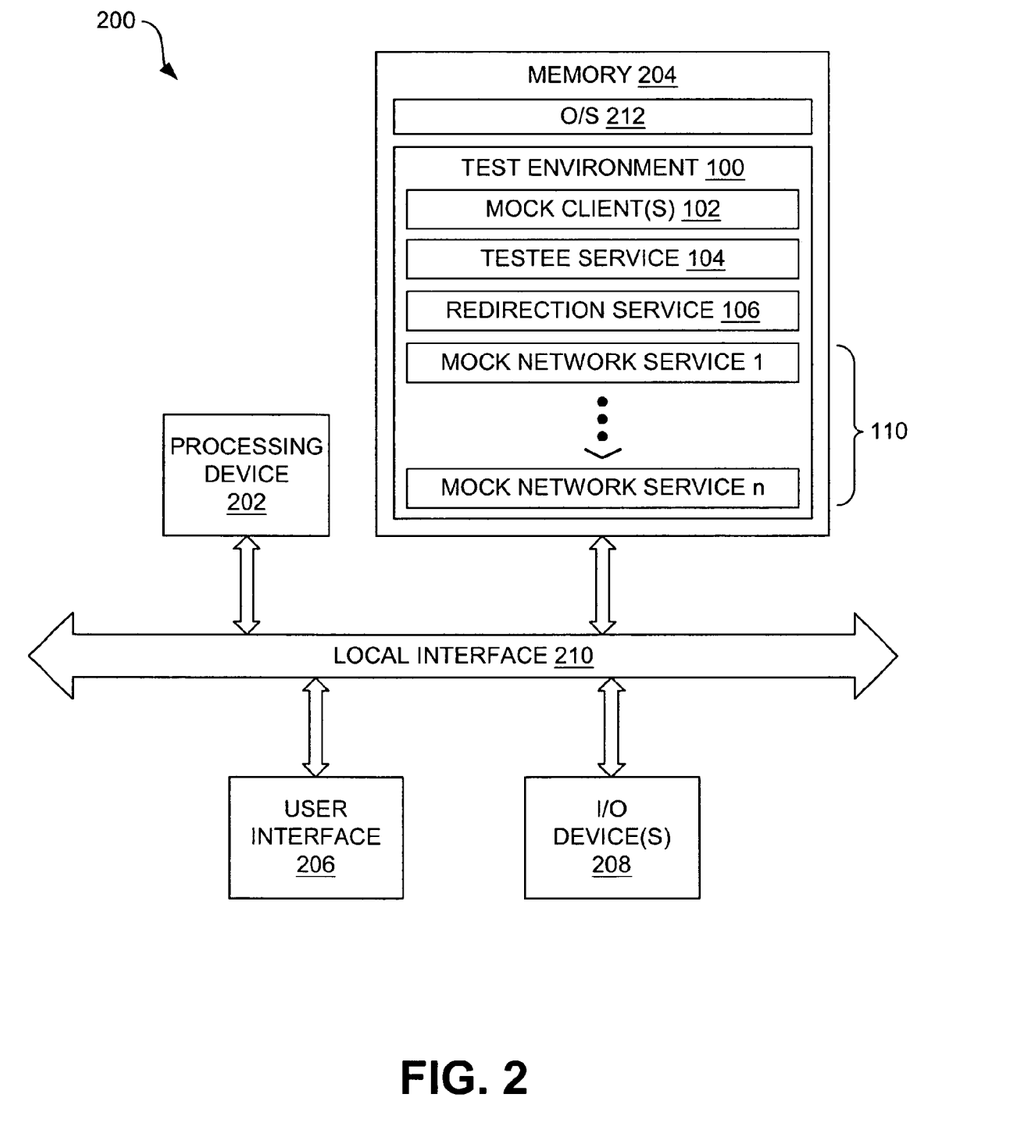
FIG. 2 is a block diagram of an embodiment of a computing device on which the system of FIG. 1 can execute.

FIG. 2 is a schematic view of an example architecture for a computing device 200 on which the test environment 100 can execute. As indicated in FIG. 2, the computing device 200 comprises a processing device 202, memory 204, a user interface 206, and one or more input/output (I/O) devices 208, each of which is connected to a local interface 210.

The processing device 202 can include a general-purpose processor, a microprocessor, one or more application-specific integrated circuits (ASICs), a plurality of suitably configured digital logic gates, or other electrical configurations comprised of discrete elements that coordinate the overall operation of the computing device 200.

The memory 204 includes any one of a combination of volatile memory elements (e.g., random access memory (RAM)) and nonvolatile memory elements (e.g., hard disk, read only memory (ROM), Flash memory, etc.).

The user interface 206 comprises the components with which a user can interact with the computing device 200. For example, where the computing device 200 comprises a personal computer (PC) or similar computer, these components can comprise, for instance, a keyboard, mouse, and a display.

With further reference to FIG. 2, the one or more I/O devices 208 comprise components that are adapted to facilitate connection of the computing device 200 to another device and may therefore include one or more serial, parallel, small computer system interface (SCSI), universal serial bus (USB), IEEE 1394 (e.g., Firewire™), or other communication components. In addition, the I/O devices 208 comprise the various components used to transmit and/or receive data over a network. By way of example, such components include one or more of a modulator/demodulator (e.g., modem), wireless (e.g., RF) transceiver, and/or a network card.

The memory 204 comprises various programs, in software and/or firmware, including an operating system (O/S) 212 and the test environment 100, which includes the mock client(s) 102, the testee service 104, the redirection service 106, and the mock network service(s) 108. The O/S 212 controls the execution of other software and provides scheduling, input-output control, file and data management, memory management, and communication control and related services. Optionally, the O/S 212 may incorporate or support a virtual machine, such as a JVM, on which the test environment 100 executes. The configuration and operation of the various components of the test environment 100 have been described above in relation to FIG. 1. Although each of those components is shown as executing on the computing device 200, one or more of those components can execute on one or more other computing devices (e.g., PC or server), if desired.

Various programs (i.e. logic) have been described herein. These programs can be stored on any computer-readable medium for use by or in connection with any computer-related system or method. In the context of this document, a "computer-readable medium" is any electronic, magnetic, optical, or other physical device or means that contains or stores a computer program for use by or in connection with a computer-related system or method. These programs can be used by or in connection with an instruction execution system, apparatus, or device, such as a computer-based system, processor-containing system, or other system that can fetch the instructions from the instruction execution system, apparatus, or device and execute the instructions.

Example systems having been described above, examples of system operation will now be discussed in relation to FIG. 3, which is a flow diagram that provides an overview of an example testing method. It is noted that process steps or blocks in the flow diagrams of this disclosure may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 3:
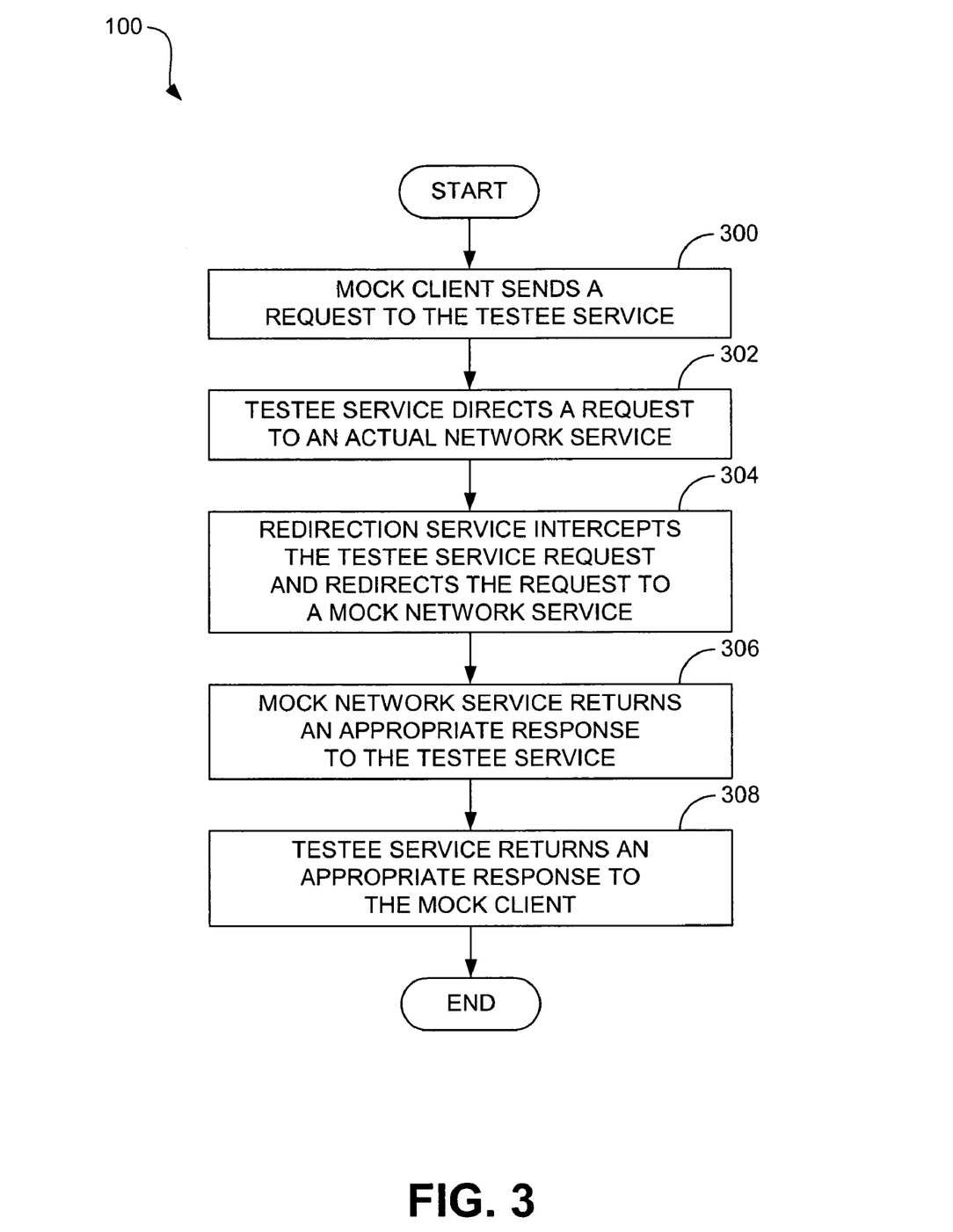
FIG. 3 is a flow diagram that illustrates an embodiment of a method for testing a web service.

With reference to block 300 of FIG. 3, the mock client 102 sends a request to the testee service 104. After the request is received, the testee service 104 directs a related request to an actual network service 108, as indicated in block 302. However, because of the presence and operation of the redirection service 106, the request is intercepted by the redirection service, and then redirected (rerouted) to a mock network service 110 that emulates operation of the actual network service 108 to which the testee service 104 attempted to send its request (block 304).

Because of the redirection, the mock network service 110 receives the testee service request and, as indicated in block 306, returns an appropriate response to the testee service 104. Once that response is received by the testee service 104, a separate response may then returned to the mock client 102, as indicated in block 308, to complete the flow for the request session.

Figure 4:
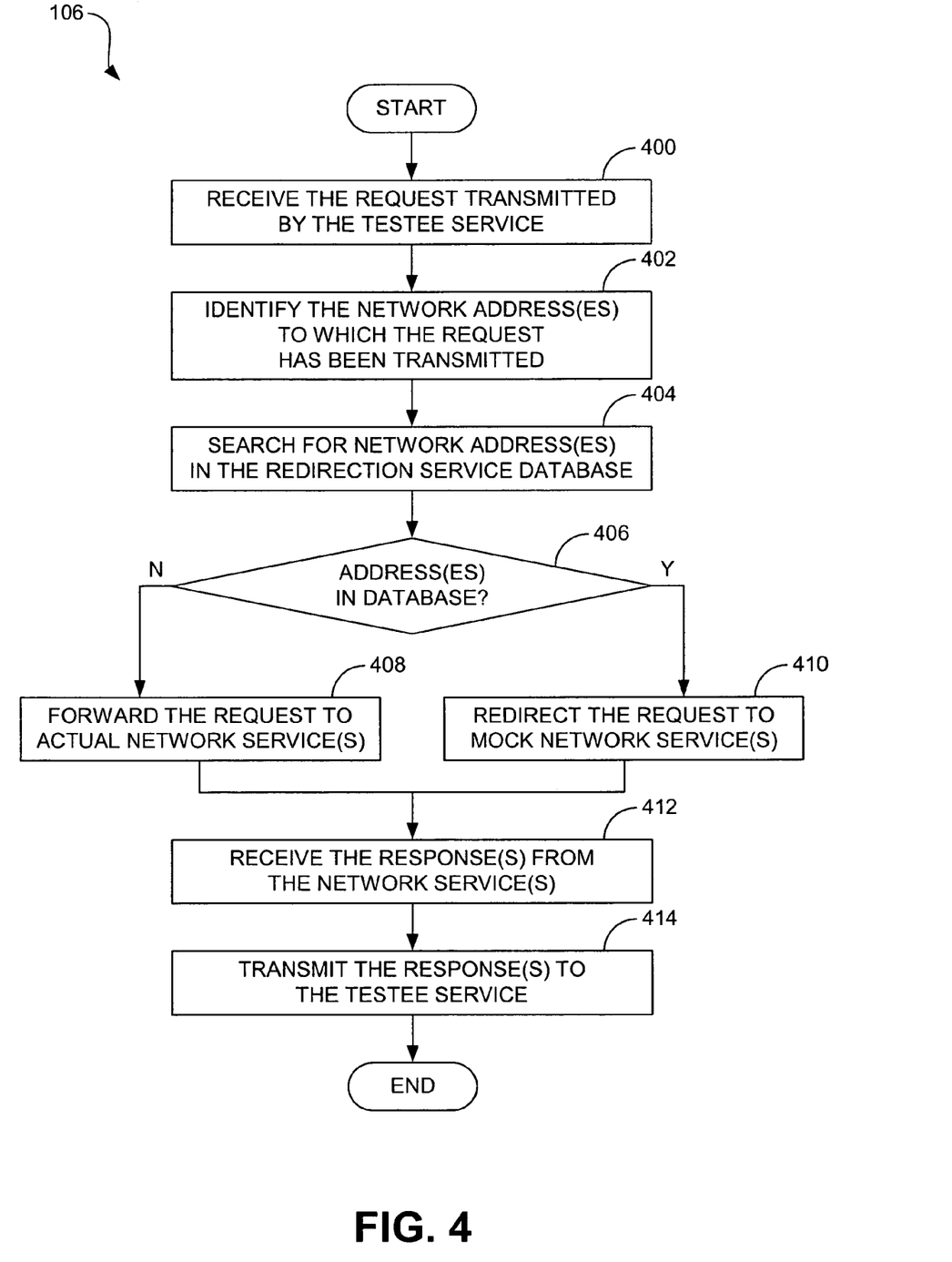
FIG. 4 is a flow diagram that illustrates an embodiment of operation of a redirection service.

FIG. 4 provides an example of operation of the redirection service 106, or "redirector." With reference to block 400, the redirection service 106 first receives a request transmitted by the testee service 104. By way of example, the request comprises an XML message that is wrapped in a SOAP envelope. Next, the redirection service 106 identifies the network address or addresses to which the request has been transmitted to by the testee service 104, as indicated in block 402. By way of example, the redirection service 106 identifies one or more URLs that have been identified by the testee service 104. Because the testee service 104 is hard-coded to interact with actual network (e.g., web) services, the URL or URLs will pertain to one or more of the actual network services 108. Once the identification has been made, the redirection service 106 searches its database 112 (e.g., lookup table) to determine whether the identified network address(es) is/are contained therein, as indicated in block 404. If not, no associated mock network service 110 exists (or is available) and, therefore, no redirection is performed. If, on the other hand, one or more of the identified network addresses are contained in the database 112, redirection to a mock network service 10 is performed.

Figure 5:
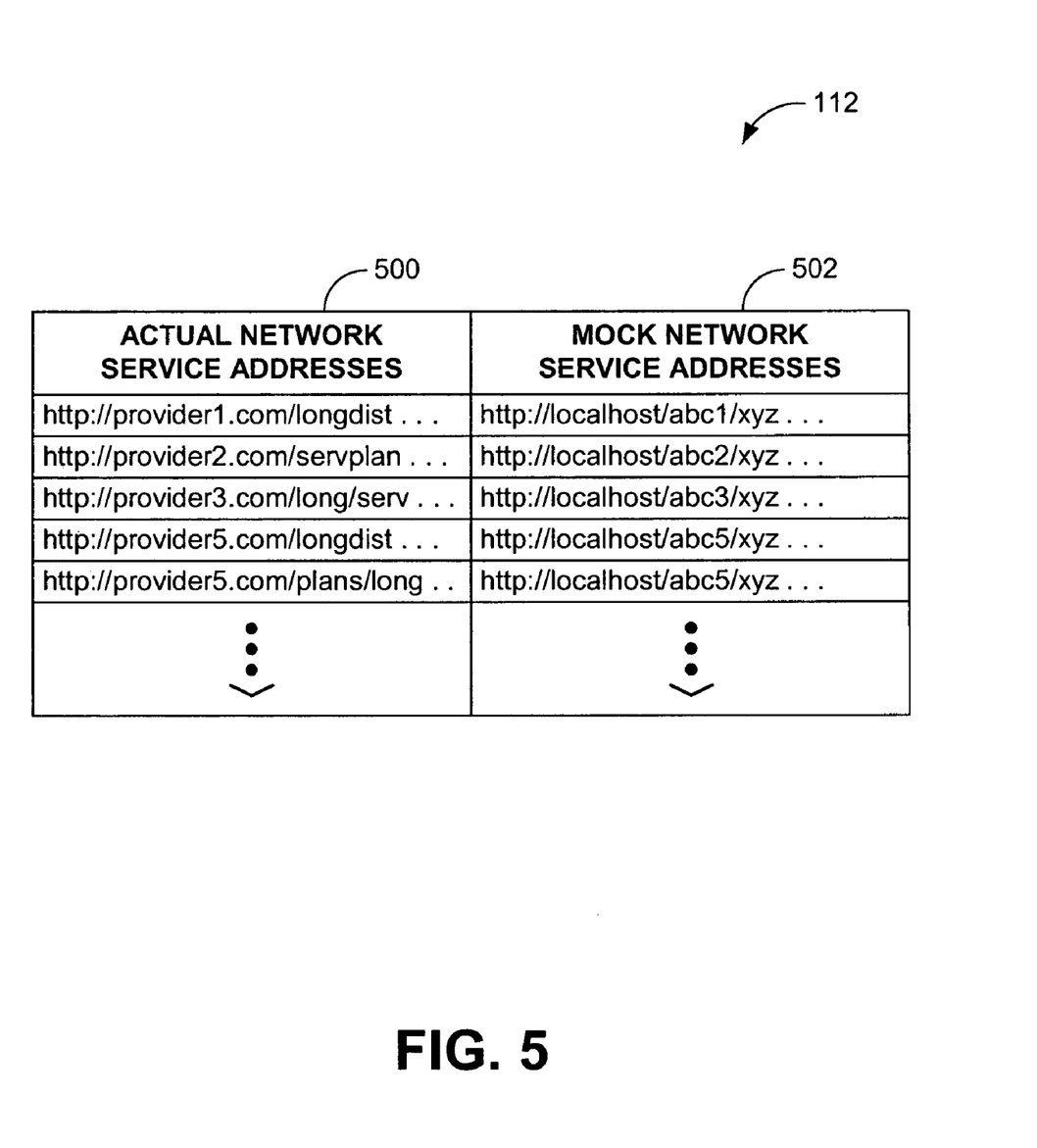
FIG. 5 is a schematic representation of a redirection service database.

FIG. 5 schematically represents and example redirection service database 112. As shown in this figure, the database 112 comprises a simple lookup table in which network address of various actual network services 108 are provided in one column 500, and the network addresses of various associated mock network services 110 are provided in another column 502. In the example of FIG. 5, a mock network service address is available for each actual network service address contained in the table.

With reference next to decision block 406 of FIG. 4, if an identified network address is not in the database 112, flow continues to block 408 at which the redirection service 106 simply forwards the request to the intended actual network service(s) 108 without performing any redirection. If, however an identified network address is contained in the database 112, the redirection service 106 redirects the request to an appropriate mock network service 110, as indicated in block 410. Specifically, the redirection service 106 writes a substitute network address into the request in place of the original network address so that the request is transmitted to one or more mock network services 110.

After the request has been processed, the redirection service 106 receives one or more responses transmitted by one or more actual network services 108 and/or one or more mock network services 110, as indicated in block 412. The response(s) are then forwarded to the testee service 104, as indicated in block 414, and flow for the redirection service 106 is terminated for the request session.

Figure 6:
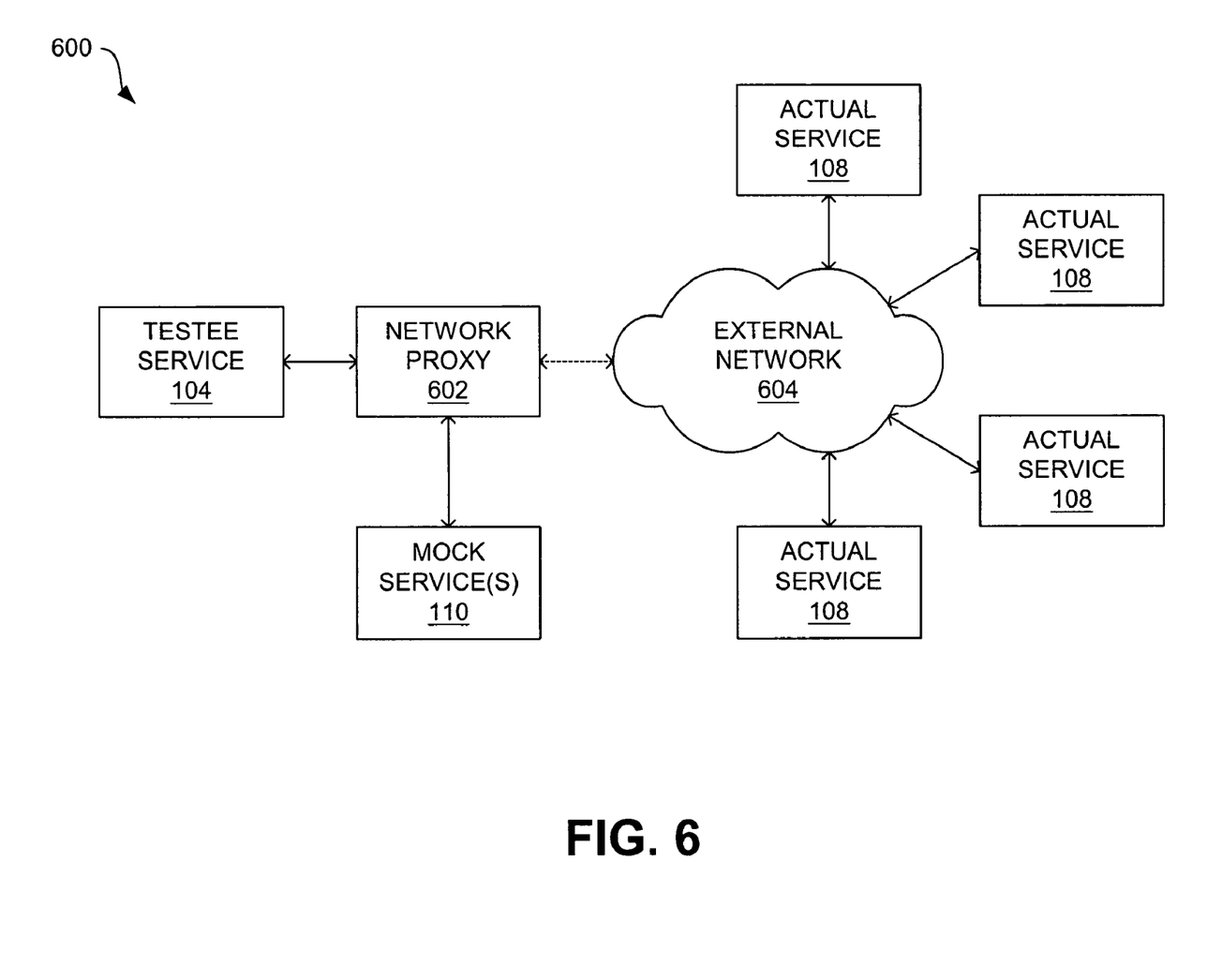
FIG. 6 is an example implementation of the system of FIG. 1 in which a network proxy is used to redirect service requests.
Figure 7:
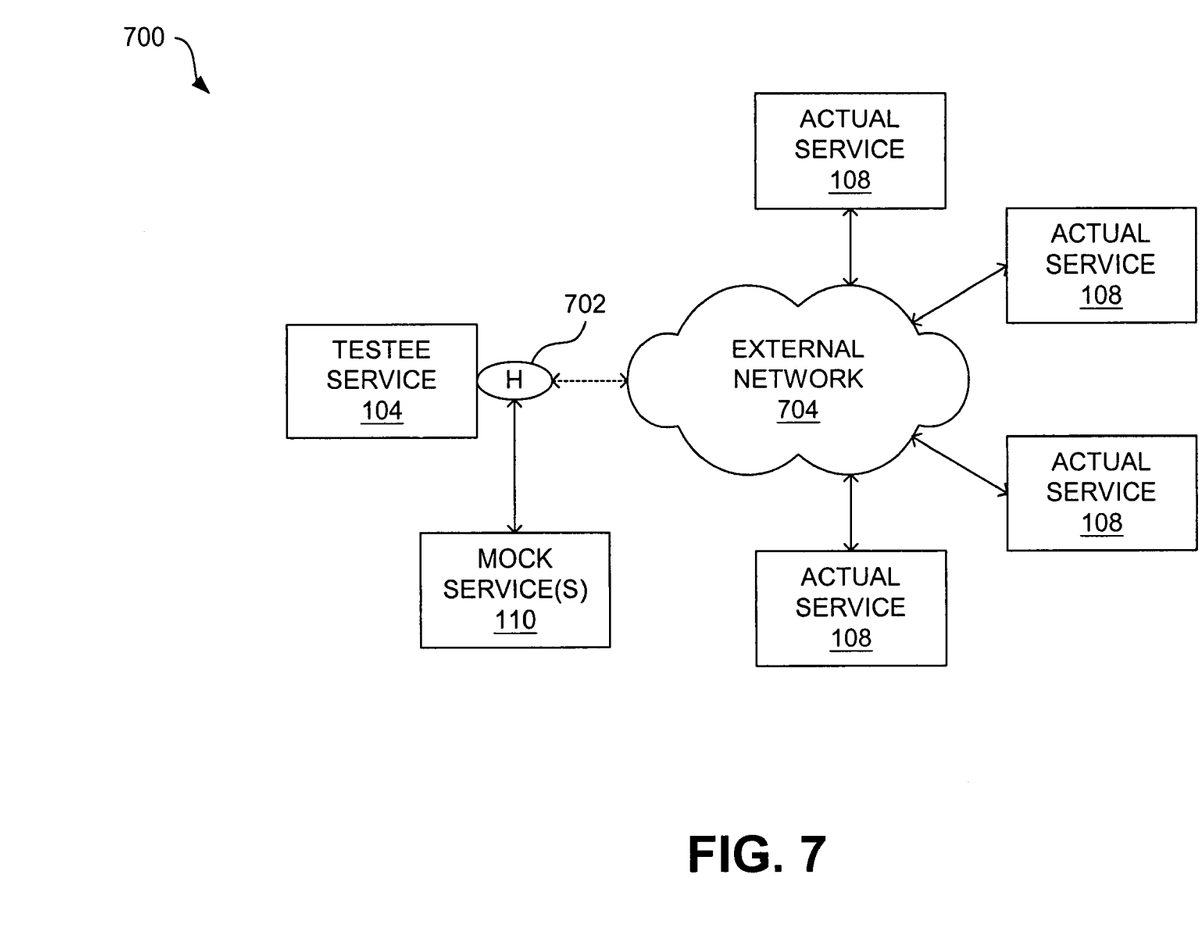
FIG. 7 is an example implementation of the system of FIG. 1 in which a data handler is used to redirect service requests.

As noted above, the redirection service 106 can comprise, for instance, a network proxy or a data handler. Example implementations of a proxy and a handler are illustrated in FIGS. 6 and 7, respectively. In particular, FIG. 6 illustrates a first system implementation 600 in which redirection is performed by a network proxy, and FIG. 7 illustrates a second system implementation 700 in which redirection is performed by a data handler.

With reference first to FIG. 6, the first system implementation 600 comprises several of the components of the system 100 shown in FIG. 1. Accordingly, the system implementation 600 includes a testee service 104, one or more actual network services 108, and one or more mock network services 110. In addition, however, the system implementation 600 includes a network proxy 602 that is positioned between the testee service 104 and an external network 604 through which the actual services 108 may be accessed. The external network 604 may comprise one or more wide area networks (WANs) and may form part of the Internet. In addition to being connected to the external network 604, the network proxy 602 is further in communication with the one or more mock network services 110.

The relationship between the testee service 104, the network proxy 602, and the mock service(s) 110 can take several different forms. For instance, as suggested by FIG. 2, each of these components may be located on the same computing device. In another embodiment, the network proxy 602 may execute on a separate computing device, such as a proxy server. Respective of the location of these components, the network proxy 602 is configured to intercept all network traffic from the testee service 104 that is intended by the service to be transmitted to an actual network service 108 out on the external network 604 and, if necessary, redirect that traffic to an appropriate mock network service 110 in the manner described above in relation to FIG. 4.

In some embodiments, the network proxy 602 comprises a conventional proxy (e.g., Web proxy server) of the type through which network traffic for a given network (e.g., local area network (LAN)), for instance behind a firewall, and that may be used to filter incoming traffic and/or cache local copies of Web objects (e.g., Web pages, files, images) to reduce network latency and traffic. In such a case, however, the network proxy 602 is modified to, as described in relation to FIG. 4, inspect intended destination addresses of testee service communications and, where appropriate, redirect those communications to a substitute address stored in a database contained within or associated with the proxy.

Use of a conventional proxy as the basis for the network proxy 602 is convenient in that such proxies "see" all network traffic in conventional applications anyway. Therefore, such proxies are well-suited to act in the capacity of a message redirector. Notably, where only the redirection functionality is desired, the network proxy 602 need not comprise filtering or caching capabilities. The network proxy 602 can be written in substantially any language including, for example, Java and C. A Java implementation may be desirable in some cases in that Java enables transmission of HTTP requests to the network proxy 602.

Referring next to FIG. 7, the second system implementation 700 is similar to the system implementation of FIG. 6, and therefore comprises a testee service 104, one or more actual network services 108, and one or more mock network services 110. In the second system implementation 700, however, a data handler 702 is used in lieu of a proxy to intercept and, if warranted, redirect testee service messages.

In most embodiments, the data handler 702 is integrated with the environment that the testee service 104 is executed in. In particular, the data handler 702 comprises an interface of the testee service 104 that intercepts all outgoing service requests, as well as all incoming responses. By way of example, the data handler 702 comprises a SOAP message handler.

Although a data handler 702 is used in the implementation shown in FIG. 7 instead of a proxy, the effect is the same. Specifically, all outgoing network traffic from the testee service 104 is intercepted so that, if warranted, that traffic may be redirected to a suitable mock network service 110 in the manner described above in relation to FIG. 4.

Figure 8:
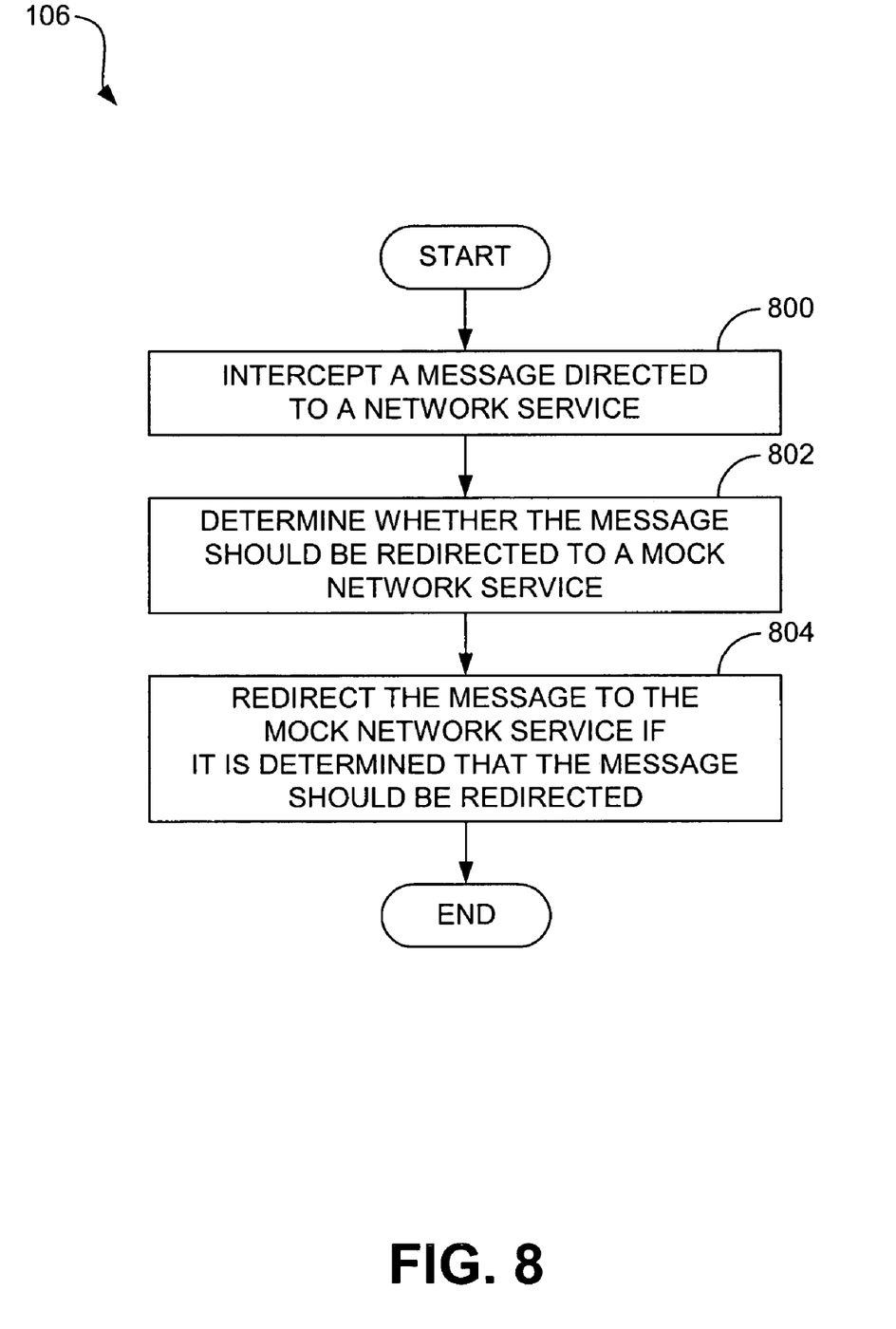
FIG. 8 is a flow diagram that summarizes an embodiment of operation of the redirection service.

In view of the above disclosure, the operation of the redirection service 106, whether comprising a proxy or a data handler, can be summarized as indicated in FIG. 8. Beginning with block 800 of that figure, the redirection service 106 intercepts a message directed to a network service, such as an actual network service 108. By way of example, that message is a request sent by the testee network service 104 and comprises an XML message wrapped in a SOAP envelope. Next, the redirection service 106 determines whether the message should be redirected to a mock network service 110, as indicated in block 802. Finally, if it is determined that the message should be so redirected, the redirection service 106 redirects the message to the mock network service 110, as indicated in block 804.

What is claimed is:

1. A method for testing a web service, the method comprising:
    a web service under test receiving a request from a client;
    the web service under test sending a message related to the received client request to an actual web service deployed on the Internet;
    a redirection service intercepting the message sent by the web service under test before the message reaches the actual web service;
    the redirection service identifying a mock web service to which the message should be redirected, the mock web service being configured to emulate operation of the actual web service; and
    the redirection service redirecting the message to the mock web service for processing.

2. The method of claim 1, wherein the web service under test receiving a request from a client comprises the web service under test receiving a request from a mock client using a web protocol.

3. The method of claim 1, wherein identifying a mock web service comprises identifying a network address of the actual web service to which the message was sent in a redirection database that cross-references actual web services with associated mock web services.

4. The method of claim 1, further comprising the redirection service receiving a response from the mock web service and transmitting the response to the web service under test.

5. A computer-readable medium that stores a redirection service for use in testing a network service, the redirection service being configured to:
    intercept a message transmitted by a web service under test to an actual web service deployed on the internet
    identify a mock web service to which the message should be redirected, the mock web service being configured to emulate operation of the actual web service; and
    redirect the message to the mock web service for processing.

6. The computer-readable medium of claim 5, wherein the redirection service comprises a redirection database that associates web addresses of actual web services to network addresses of mock web services.

7. The method of claim 1, wherein intercepting the message comprises intercepting a message directed via a hypertext transfer protocol to the actual web service.

8. The method of claim 1, wherein intercepting the message comprises intercepting a hypertext markup language (HTML) message or an extensible markup language (XML) message.

9. A method for testing a web service, the method comprising:
    a mock client that emulates an actual client sending a request to a web site associated with a web service under test;
    the web service under test receiving the request and directing a related request to a web site associated with an actual web service that is deployed on the internet;
    a redirection service intercepting the related request such that the related request does not reach the web site associated with the actual web service;
    the redirection service identifying a mock web service to which the message should be redirected, the mock web service being configured to emulate operation of the actual web service;
    the redirection service rerouting the related request to the mock web service that emulates operation of the actual web service;
    the mock web service identifying a response output responsive to the related request and transmitting the response output to the redirection service; and
    the redirection service transmitting the response output to the web service under test.

10. The method of claim 9, wherein directing a related request to a web site associated with an actual web service comprises sending a hypertext markup language (HTML) message or an extensible markup language (XML) message via hypertext transfer protocol (HTTP).

11. The method of claim 9, wherein identifying a mock web service comprises the redirection service searching a database for a web address to which the related request is directed and identifying a network address associated with the mock web service.

12. The method of claim 9, wherein the mock client, web service under test, and the mock web service execute on top of a virtual machine.

13. A testing system, comprising:
    a mock client that emulates operation of an actual web client, the mock client being configured to send via a web protocol requests to a web service under test;
    a web service under test configured to (i) receive the requests sent by the mock client, (ii) generate related requests, and (iii) send via a web protocol the related requests to actual web services that are deployed on the internet;
    a redirection service configured to (i) intercept the related requests sent by the web service under test, (ii) identify a mock web services that emulates operation of the actual web service, (iii) redirect the related requests to the mock web services such that the related requests do not reach the actual web services, (iv) receive responses to the related requests from the mock web services, and (v) send via a web protocol the responses to the web service under test; and
    a mock web service configured to (i) receive the related requests from the redirection service, (ii) identify associated responses, and (iii) send the responses to the redirection service.

14. The system of claim 13, wherein the redirection service is configured to identify mock web services by referencing a redirection database that cross-references actual web services with associated mock web services.

* * * * *

UNITED STATES PATENT AND TRADEMARK OFFICE
CERTIFICATE OF CORRECTION

PATENT NO. : 7,496,658 B2  
APPLICATION NO. : 10/615547  
DATED : February 24, 2009  
INVENTOR(S) : Blaine R. Southam et al.

It is certified that error appears in the above-identified patent and that said Letters Patent is hereby corrected as shown below:

In column 7, line 29, delete "10" and insert -- 110 --, therefor.

In column 8, line 17, delete "Respective" and insert -- Irrespective --, therefor.

In column 9, line 44, in Claim 5, delete "internet" and insert -- Internet; --, therefor.

Signed and Sealed this

Twenty-eighth Day of July, 2009

JOHN DOLL  
*Acting Director of the United States Patent and Trademark Office*